US008920672B2

(12) United States Patent
Choi et al.

(10) Patent No.: US 8,920,672 B2
(45) Date of Patent: Dec. 30, 2014

(54) NEGATIVE ACTIVE MATERIAL FOR RECHARGEABLE LITHIUM BATTERY, METHOD OF PREPARING SAME AND RECHARGEABLE LITHIUM BATTERY INCLUDING SAME

(75) Inventors: Nam-Soon Choi, Yongin-si (KR);
Sung-Soo Kim, Yongin-si (KR);
Yong-Mook Kang, Yongin-si (KR);
Kyoung-Han Yew, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 255 days.

(21) Appl. No.: 13/347,577

(22) Filed: Jan. 10, 2012

(65) Prior Publication Data

US 2012/0104312 A1 May 3, 2012

Related U.S. Application Data

(62) Division of application No. 11/590,980, filed on Oct. 31, 2006, now Pat. No. 8,119,283.

(30) Foreign Application Priority Data

Oct. 31, 2005 (KR) .................. 10-2005-0103281

(51) Int. Cl.

| H01B 1/00 | (2006.01) |
| H01B 1/02 | (2006.01) |
| H01B 1/04 | (2006.01) |
| H01B 1/06 | (2006.01) |
| H01B 1/08 | (2006.01) |
| H01B 1/12 | (2006.01) |
| H01B 1/22 | (2006.01) |
| B05D 5/12 | (2006.01) |
| H01M 4/13 | (2010.01) |
| H01M 4/58 | (2010.01) |
| H01M 4/134 | (2010.01) |
| H01M 4/36 | (2006.01) |
| H01M 4/1395 | (2010.01) |
| H01M 10/052 | (2010.01) |
| H01M 4/02 | (2006.01) |
| H01M 4/137 | (2010.01) |

(52) U.S. Cl.
CPC ............. *H01M 4/13* (2013.01); *H01M 4/134* (2013.01); *H01M 4/366* (2013.01); *H01M 4/1395* (2013.01); *H01M 2004/027* (2013.01); *H01M 4/137* (2013.01); *H01M 10/052* (2013.01); *Y02E 60/122* (2013.01); *H01M 2004/021* (2013.01)
USPC ........ 252/182.1; 252/500; 252/513; 252/514; 252/518.1; 252/519.3; 252/519.31; 252/520.1; 252/520.2; 252/521.3; 427/58; 427/123; 427/126.1; 429/218.1

(58) Field of Classification Search
USPC ....................................................... 252/500
See application file for complete search history.

(56) References Cited

U.S. PATENT DOCUMENTS

| 6,019,803 A * | 2/2000 | Oskam et al. ................ 29/623.5 |
| 2001/0046628 A1 | 11/2001 | Oesten et al. |
| 2005/0079417 A1 | 4/2005 | Kim et al. |
| 2006/0088766 A1 | 4/2006 | Kim et al. |
| 2007/0099085 A1 | 5/2007 | Choi et al. |
| 2007/0207384 A1 | 9/2007 | Nakura |

FOREIGN PATENT DOCUMENTS

| EP | 1511101 A2 | 3/2005 | |
| JP | 8-124568 | 5/1996 | |
| JP | 2001-006683 | 1/2001 | |
| JP | 2001210375 A * | 8/2001 | ........... H01M 10/40 |
| JP | 2001-297796 | 10/2001 | |
| JP | 2002-324551 | 11/2002 | |
| JP | 2003-208891 | 7/2003 | |
| KR | 10-0331370 | 8/1995 | |
| KR | 2001-0090522 | 10/2001 | |
| KR | 10-2003-0021112 | 3/2003 | |
| KR | 10-2004-0082803 | 9/2004 | |
| KR | 10-2005-0077079 | 8/2005 | |
| WO | WO 95/02001 | 1/1995 | |

OTHER PUBLICATIONS

Colilla et al. Amino-polysiloxane hybrid materials as carbon composite electrodes for potentiometric detection of anions. J. Mater. Chem, 2005, 15, 3844-3851.*
Office action for U.S. Appl. No. 11/984,807 dated Feb. 23, 2010 (31 pages).
Office action for U.S. Appl. No. 11/984,807 dated Jul. 21, 2010 (21 pages).
Search Report from the European Patent Office issued in Applicant's corresponding European Patent Application No. 07121149.4 dated Feb. 27, 2008.
Oskam, et al., "Sol-Gel Synthesis of Carbon/Silica Gel Electrodes for Lithium Intercalation", Electrochemical and Solid-State Letters, vol. 2, No. 12, Dec. 1999, p. 610-612.
Ng, et al., "Si-O Network Encapsulated Graphite-Silicon Mixtures as Negative Electrodes for Lithium-ion Batteries", Journal of Power Sources, vol. 94, No. 1, Feb. 15, 2001, p. 63-67.
Aurbach, et al., "Behavior of Lithiated Graphite Electrodes Comprising Silica Based Binder", Journal of Applied Electrochemistry vol. 28, No. 10, Oct. 1998, p. 1051-1059.

(Continued)

*Primary Examiner* — Harold Pyon
*Assistant Examiner* — Tanisha Diggs
(74) *Attorney, Agent, or Firm* — Christie, Parker & Hale, LLP

(57) ABSTRACT

The present invention relates to negative active materials for rechargeable lithium batteries, manufacturing methods thereof, and rechargeable lithium batteries including the negative active materials. A negative active material for a rechargeable lithium battery includes a core including a material capable of carrying out reversible oxidation and reduction reactions and a coating layer formed on the core. The coating layer has a reticular structure.

10 Claims, 6 Drawing Sheets

(56) References Cited

OTHER PUBLICATIONS

Chen, et al., "Improving the Performance of Soft Carbon for Lithium-ion Batteries", Electrochemical Acta, vol. 51, No. 19, May 20, 2006, p. 3890-3894.

Occlude, absorption. Dictionary.com. Dictionary.com Unabridged. Random House, Inc. http://dictionary.reference.com/browse/absorption (accessed: Jul. 15, 2010).

Patent Abstracts of Japan for Publication No. 08-124568 filed on May 17, 1996 in the name of Kawakami et al.

* cited by examiner

M : Si, Ti, or Al

NEGATIVE ACTIVE MATERIAL FOR RECHARGEABLE LITHIUM BATTERY, METHOD OF PREPARING SAME AND RECHARGEABLE LITHIUM BATTERY INCLUDING SAME

CROSS-REFERENCE TO RELATED APPLICATION

This application is a divisional of U.S. patent application Ser. No. 11/590,980, filed Oct. 31, 2006, which claims priority to and the benefit of Korean Patent Application No. 10-2005-0103281, filed Oct. 31, 2005, the entire content of both of which is incorporated herein by reference.

FIELD OF THE INVENTION

The present invention relates to negative active materials for rechargeable lithium batteries, methods of manufacturing the same, and rechargeable lithium batteries including the same. More particularly, the present invention relates to negative active materials that improve the reversible efficiency and cycle characteristics of rechargeable lithium batteries.

BACKGROUND OF THE INVENTION

Rechargeable lithium batteries use materials capable of reversibly intercalating or deintercalating lithium ions in the positive and negative electrodes, and include organic electrolyte solutions or polymer electrolytes between the positive and negative electrodes. Rechargeable lithium batteries generate electrical energy by oxidation/reduction reactions during the intercalation/deintercalation of lithium ions at the positive and negative electrodes.

For positive active materials, composite metal oxides, such as $LiCoO_2$, $LiMn_2O_4$, $LiNiO_2$, $LiNi_{1-x}Co_xO_2$ ($0<x<1$), $LiMnO_2$, etc., have been researched.

Conventionally, lithium metals have been used as the negative active materials for rechargeable lithium batteries. However, when using lithium metal, dendrites form causing a short circuit in the battery which can lead to explosion. Therefore, carbonaceous materials, such as amorphous carbon, crystalline carbon, etc., have recently been used in place of lithium metals as the negative active materials. However, such carbonaceous materials increase irreversible capacity by 5 to 30% during the first several cycles, which wastes lithium ions and prevents at least one active material from being fully charged and discharged. Therefore, carbonaceous materials impart disadvantageous energy densities.

In addition, it is known that metal negative active materials such as Si, Sn, etc., which supposedly have high capacities, also impart irreversible capacity characteristics. Further, tin oxide has been investigated as an alternative to carbonaceous negative active materials. However, the metal is included in the negative active material in an amount of 30% or less, thereby decreasing the initial coulomb efficiency. Further, lithium is continuously intercalated and deintercalated, thereby generating lithium-metal alloys and remarkably decreasing capacity. In addition, the capacity retention rate remarkably deteriorates after repeating 150 charge and discharge cycles. As a result, these negative active materials are not commercially viable. Accordingly, much research has been conducted to improve these characteristics.

SUMMARY OF THE INVENTION

According to one embodiment of the present invention, a negative active material for a rechargeable lithium battery has excellent reversible characteristics.

In another embodiment of the present invention, a negative active material for a rechargeable lithium battery has excellent cycle-life characteristics.

According to a further embodiment of the present invention, a method of fabricating the negative active material is provided.

In a still further embodiment of the present invention, a rechargeable lithium battery includes the negative active material.

According to one embodiment of the present invention, a negative active material for a rechargeable lithium battery comprises a core including an active material capable of carrying out electrochemically reversible oxidation and reduction reactions and a coating layer formed on the core, wherein the coating layer has a reticular structure.

According to another embodiment of the present invention, a method of fabricating a negative active material for a rechargeable lithium battery includes mixing a core material, an organic solvent, a base, and water to provide a core solution and mixing the core solution with a precursor solution comprising an organic-inorganic hybrid precursor, an organic solvent, and water to provide a mixture.

In a further embodiment of the present invention, a rechargeable lithium battery includes a negative electrode, a positive electrode, and an electrolyte. The negative electrode comprises a core including an active material capable of carrying out electrochemically reversible oxidation and reduction reactions and a coating layer formed on the core, wherein the coating layer has a reticular structure. The positive electrode includes a positive active material.

BRIEF DESCRIPTION OF THE DRAWINGS

These and other features and advantages of the present invention will be better understood with reference to the following detailed description when considered in conjunction with the attached drawings in which.

DETAILED DESCRIPTION OF THE INVENTION

Figure 1A:
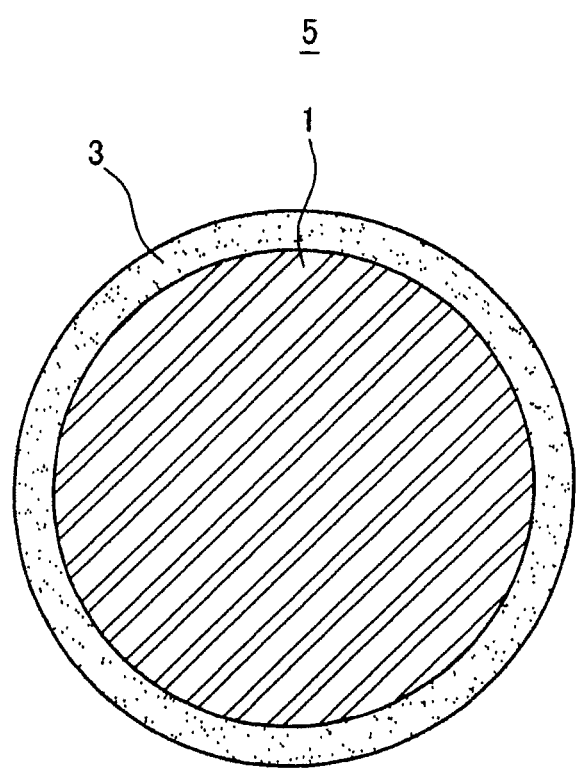
FIG. 1A is a schematic depicting the structure of a negative active material for a rechargeable lithium battery according to one embodiment of the present invention.

The present invention relates to negative active materials for rechargeable lithium batteries. In one exemplary embodiment, a negative active material has a core-shell structure and includes a core and a coating layer.

The core includes an active material capable of carrying out electrochemically reversible oxidation and reduction reactions. In one embodiment, the active material includes a material selected from the group consisting of lithium metals, alloys of lithium metals, materials capable of intercalating and deintercalating lithium ions, and materials capable of reacting with lithium ions to reversibly generate lithium-containing compounds.

The material capable of intercalating and deintercalating lithium ions may include any carbonaceous negative active material commonly used in the rechargeable lithium ion battery field. Non-limiting examples thereof include crystalline carbon, amorphous carbon, and combinations thereof.

Further, non-limiting examples of suitable materials capable of reacting with lithium ions to reversibly generate lithium-containing compounds include Si, Si oxides, Sn, Sn oxides, composite tin alloys, transition metal oxides, lithium metal nitrides, and lithium metal oxides, such as lithium vanadium oxides.

Non-limiting examples of suitable lithium alloys include lithium alloys having a metal selected from the group consisting of Na, K, Rb, Cs, Fr, Be, Mg, Ca, Sr, Ba, Ra, Al, Fe, and Sn.

The reticular coating layer is formed on the core. As used herein, the term "reticular coating layer" means that the coating layer covers the core in a net-like or web-like fashion. The coating layer includes materials having an element selected from the group consisting of Si, Ti, and Al. Particularly, the coating layer has an -M-O-M- structure (wherein M is Si, Ti, or Al) surrounding the core, and includes an organic functional group bonded to M as a side chain. The organic functional group is bonded to M but is not bonded to the core. The organic functional group is represented by $R_1$—CH=C($R_2$, $R_3$)$_m$—($R_4$)$_n$—, wherein, $R_1$ and $R_2$ are independently selected from H, $CH_3$, or $CH_2CH_3$, $R_3$ is $CO_2$, $R_4$ is $CH_2$ or $CH_2CH_2O$, m is 0 or 1, and n ranges from 1 to 5.

Further, the coating layer can conduct lithium ions and has a nano-sized thickness with little resistance. In one embodiment, the coating layer has a thickness of about 20 nm or less. In another embodiment, the coating layer has a thickness of about 10 nm or less. In yet another embodiment, the coating layer has a thickness ranging from about 5 nm to about 10 nm. When the thickness of the coating layer is greater than about 20 nm, the coating layer begins acting as a resistance layer, deteriorating the rate of electron transmission by lithium ions to both the surface and the inner space of the core of the active material. This results in remarkable deteriorations in the electrochemical characteristics (i.e., high-rate characteristics, cycle-life characteristics, etc.) of the active material.

Figure 1B:
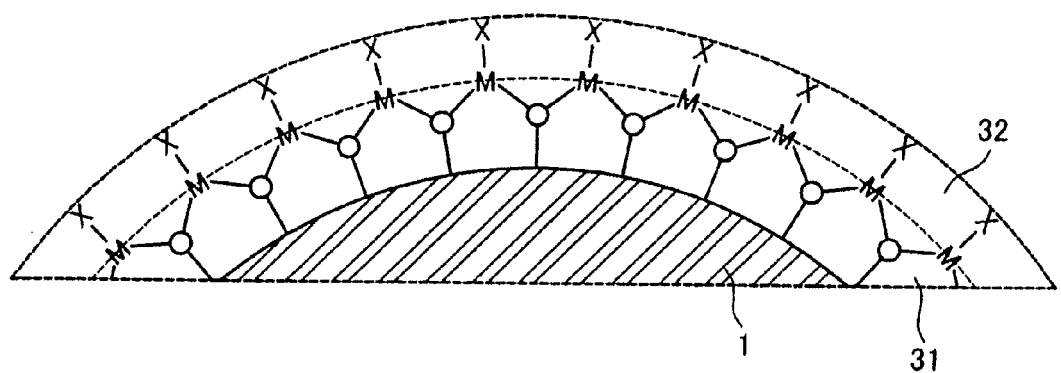
FIG. 1B is a close-up view of the negative active material of FIG. 1A.
Figure 1B:
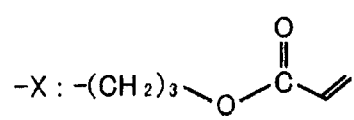

FIGS. 1A and 1B are schematics of the active material according to one embodiment of the present invention, in which M is Si. As shown in FIG. 1A, the active material 5 has a core-shell structure in which a coating layer 3 is formed on a core 1. As more clearly shown in FIG. 1B, the coating layer 3 includes —Si—O— units surrounding the core surface, and Si is bonded with $CH_2$=$CH_2COO(CH_2)_3$— side chains. As also shown in FIG. 1B, the coating layer has a reticular structure 31 in which siloxane bonds surround the core 1. Organic chains 32 are bonded to the reticular structure 31.

Conventional negative active materials react with the electrolyte at the surface during charge and discharge to electrochemically decompose the electrolyte to from a solid electrolyte interface (SEI) film on the negative active material surface. According to one embodiment of the present invention, SEI film formation is minimized by surrounding the surface of the core material with -M-O-M- units, resulting in improvement of the reversible efficiency and cycle-life characteristics during charge and discharge cycles.

One embodiment of a method of fabricating a negative active material for a rechargeable lithium battery includes preparing a mixture of a core solution including a core material, an organic solvent, a base, and water with a precursor solution including an organic-inorganic hybrid precursor, an organic solvent, and water. The core material is present in an amount ranging from about 1 to about 10 g per 1000 ml of the organic solvent. The base is present in a concentration ranging from about 0.05 to about 1M. The water is adjusted in the core solution and the precursor solution to provide a concentration ranging from about 10 to 20 M. The mixture rate of the core solution and the precursor solution is adjusted to provide these materials within the above ranges in the resultant mixture. The organic-inorganic hybrid precursor is present in an amount ranging from about 1 to about 30 wt %, based on the total weight of the core material. In one embodiment, the organic-inorganic hybrid is present in an amount ranging from about 1 to about 10 wt %, based of the total weight of the core material. When the organic-inorganic hybrid precursor is present in an amount less than about 1 wt %, the advance formation of the coating layer is insufficient. When the organic-inorganic hybrid is present in an amount greater than about 30 wt %, an excessively thick reticular membrane is formed so that the membrane increases the resistance of the electrode.

The core solution is provided by dispersing the core material in the organic solvent, and adding the base and the water into the prepared mixture. The base acts as a catalyst for catalyzing the reaction, and may include any base that can perform this role having a pH ranging from about 8 to about 9, for example ammonia solution.

Non-limiting examples of suitable organic solvents include alcohols such as methanol, ethanol, and propanol.

The precursor solution is prepared by mixing the organic-inorganic hybrid precursor, the organic solvent, and water. Non-limiting examples of suitable organic solvents for the precursor solution include alcohols such as methanol, ethanol, and propanol.

The organic-inorganic hybrid precursor is a material in which a M is bonded with at least two functional groups taking part in a sol-gel reaction and with one or two functional group(s) not taking part in the sol-gel reaction. In one embodiment, M is bonded with one functional group not taking part in the sol-gel reaction.

According to one embodiment, the organic-inorganic hybrid precursor may be represented by the following Formula 1:

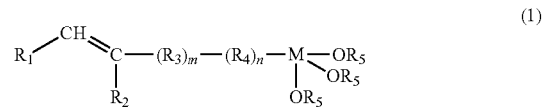

In Formula 1, $R_1$ and $R_2$ are independently selected from H, $CH_3$, or $CH_2CH_3$. $R_3$ is $CO_2$. $R_4$ is $CH_2$ or $CH_2CH_2O$. $R_5$ is a $C_1$ to $C_5$ linear alkyl. M is Si, Ti, or Al, m is 0 or 1, and n is 1 to 5.

Non-limiting examples of suitable organic-inorganic hybrid precursors include $CH_3CH$=$CHCOO$—$(CH_2)_3$—Si—$(OCH_3)_3$ and $CH_3CH$=$CHCOO$—$(CH_2)_3$—Si—$(OCH_2CH_3)_3$.

In mixing the core solution and the precursor solution, the precursor surrounds the core material and hydrolysis and condensation reactions are simultaneously conducted, thereby forming the reticular coating layer (from the precursor) on the core material surface. The provided reticular coating layer has a nano-sized thickness, e.g. about 20 nm or less. In one embodiment, the coating layer has a thickness of about 10 nm or less. In another embodiment, the coating layer has a thickness ranging from about 5 to about 10 nm. The core material includes the above-mentioned active material. When the coating layer has an organic functional group, miscibility of the electrode composition with the binder is increased.

According to one embodiment of the present invention, a rechargeable lithium battery including the above-described negative active material includes a negative electrode, a positive electrode, and an electrolyte. The positive electrode may include an active material capable of carrying out electrochemical oxidation and reduction reactions, and may include any lithiated intercalation compound generally used in the rechargeable lithium battery field. Non-limiting examples of suitable lithiated intercalation compounds include compounds represented by the following Formulae (2) to (15).

$$LiAO_2 \quad (2)$$

$$LiMn_2O_4 \quad (3)$$

$$Li_aNi_bB_cM_dO_2 \quad (4)$$

$$(0.95 \leq a \leq 1.1, 0 \leq b \leq 0.9, 0 \leq c \leq 0.5, 0.001 \leq d \leq 0.1)$$

$$Li_aNi_bCo_cMn_dM_eO_2 \quad (5)$$

$$(0.95 \leq a \leq 1.1, 0 \leq b \leq 0.9, 0 \leq c \leq 0.5, 0 \leq d \leq 0.5, 0.001 \leq e \leq 0.1)$$

$$Li_aAM_bO_2 \quad (6)$$

$$(0.95 \leq a \leq 1.1, 0.001 \leq b \leq 0.1)$$

$$Li_aMn_2M_bO_4 \quad (7)$$

$$(0.95 \leq a \leq 1.1, 0.001 \leq b \leq 0.1)$$

$$DX_2 \quad (8)$$

$$LiDS_2 \quad (9)$$

$$V_2O_5 \quad (10)$$

$$LiV_2O_5 \quad (11)$$

$$LiEO_2 \quad (12)$$

$$LiNiVO_4 \quad (13)$$

$$Li_{3-x}F_2(PO_4)_3 \quad (14)$$

$$(0 \leq x \leq 3)$$

$$Li_{3-x}Fe_2(PO_4)_3 \quad (15)$$

$$(0 \leq x \leq 2)$$

In Formulae (2) to (15), A is selected from the group consisting of Co, Ni, and Mn. B is Co or Mn. D is Ti, Mo, or Mn. E is selected from the group consisting of Cr, V, Fe, Sc, and Y. F is selected from the group consisting of V, Cr, M, Co, Ni, and Cu. M is selected from the group consisting of Al, Cr, Mn, Fe, Mg, La, Ce, Sr, V and mixtures thereof. X is O or S.

The electrolyte solution includes a non-aqueous organic solvent and a lithium salt. The lithium salt is dissolved in the non-aqueous organic solvent to supply lithium ions in the battery. The lithium salt enables basic operation of the rechargeable lithium battery by facilitating the transmission of lithium ions between the positive and negative electrodes. Non-limiting examples of suitable lithium salts include supporting electrolytic salts such as $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)$ $(C_yF_{2y+1}SO_2)$ (where x and y are natural numbers), LiCl, and LiI. The concentration of the lithium salt ranges from about 0.1 to about 2.0 M. When the concentration of the lithium salt is less than about 0.1M, electrolyte performance deteriorates due to low ionic conductivity. When the concentration of the lithium salt is greater than about 2.0 M, lithium ion mobility decreases due to increased electrolyte viscosity.

The non-aqueous organic solvent acts as a medium for transmitting ions taking part in the electrochemical reactions of the battery. Non-limiting examples of suitable non-aqueous organic solvents include benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (where R is a C2 to C50 linear, branched, or cyclic hydrocarbon, a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, propylene carbonate, methyl propionate, ethyl propionate, methyl acetate, ethyl acetate, propyl acetate, dimethoxyethane, 1,3-dioxolan, diglyme, tetraglyme, ethylene carbonate, propylene carbonate, γ-butyrolactone, sulfolane, valerolactone, decanolide, mevalolactone, and mixtures thereof. When a mixture of organic solvents is used, the mixture ratio can be controlled in accordance with the desired battery performance.

Figure 2:
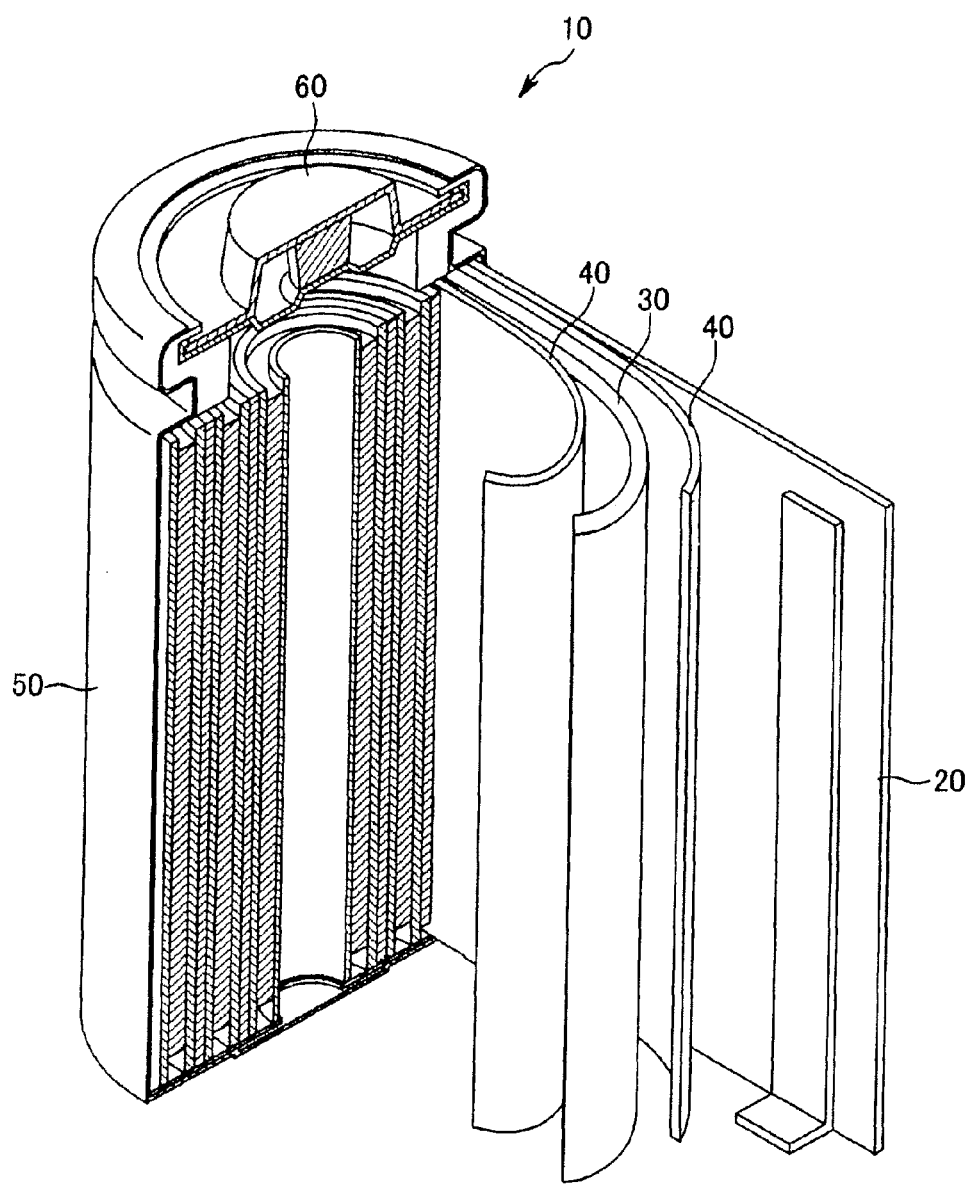
FIG. 2 is a schematic perspective view of a rechargeable lithium battery according to one embodiment of the present invention.

FIG. 2 is a schematic depicting one embodiment of a rechargeable lithium battery having the above-mentioned structure. As shown in FIG. 2, in one embodiment of the present invention, a cylindrical lithium ion cell 10 includes a negative electrode 20, a positive electrode 30, a separator 40 between the negative electrode 20 and the positive electrode 30, an electrolyte impregnated in the separator 40, a battery case 50, and a sealing assembly 60 for sealing the battery case 50. Rechargeable lithium batteries according to the present invention are not limited to this shape, and may take any suitable shape, for example a prism, a pouch, etc.

The following examples illustrate the present invention in more detail. However, these examples are provided for illustrative purposes only and it is understood that they do no limit the scope of the present invention.

Example 1

1 g of a core material containing silicon (average particle size of 10 mm) was dispersed in 100 ml ethanol to provide a first solution. A 0.2 M ammonia solution in which ammonia was mixed with water in a volume ratio of 29:71 was then introduced to the first solution, and the resulting mixture was uniformly mixed to provide a core solution.

A 3-(trimethoxysilyl)propyl methacrylate precursor in an amount of 10 wt % based on the weight of the core material was mixed in 1 ml of ethanol and 1 ml of water to provide a precursor solution. The precursor solution was rapidly added into the core solution. Hydrolysis and condensation reactions were carried out on the surface of the negative active material (i.e. on the surface of the core material). Thereby, a coating layer was formed on the negative active material. The coating layer had a reticular structure in which $SiO_2$ was covalently bonded to an organic chain. The coating layer was formed to a thickness of 20 nm.

Figure 3:
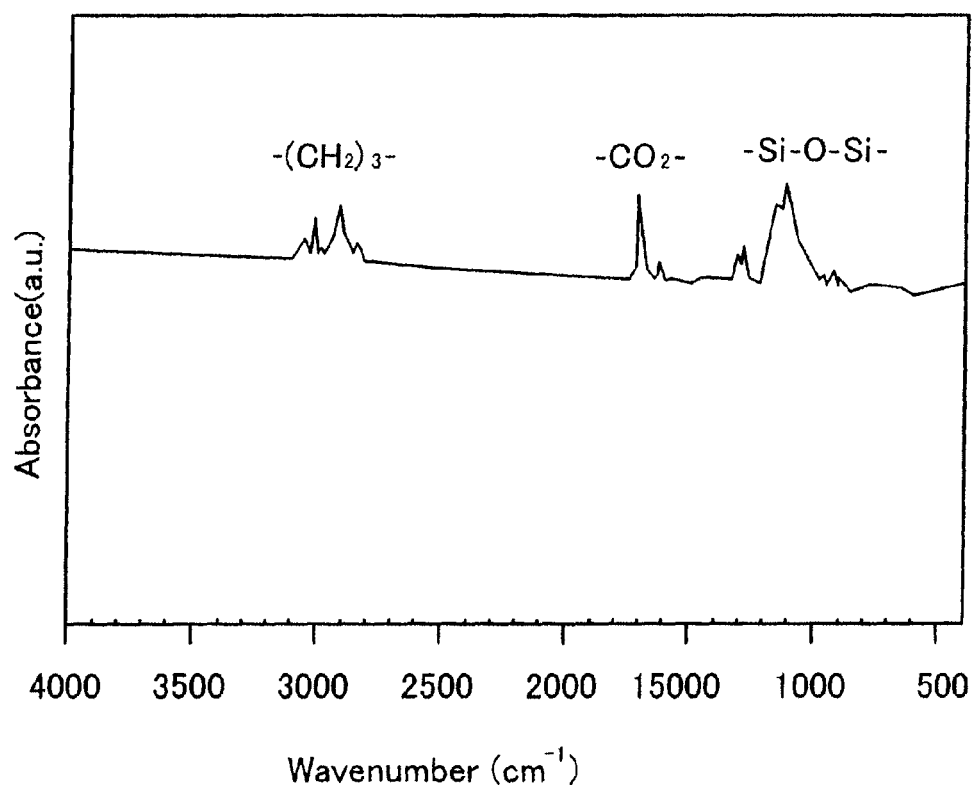
FIG. 3 is a graph of the FT-IR spectrum of the negative active material prepared according to Example 1.

A Fourier Transform—Infrared (FT-IR) spectrum was taken of the negative active material prepared according to Example 1 to find the structure of the coating layer, and the results are shown in FIG. 3. As shown in FIG. 3, it was confirmed that the coating layer was formed with $CH_2$ bonds, $CO_2$ bonds, and Si—O—Si bonds.

Examples 2 and 3

With the compositions shown in the following Table 1, negative active materials were prepared having reticular coating layers in which $SiO_2$ and organic chains were covalently bonded.

In Table 1, ethanol is represented in volume (mL), water and the base catalyst of ammonia solution are represented in molar concentration (M), and the organic-inorganic hybrid precursor is represented in wt %.

TABLE 1

|  | core material (silicon) | ethanol (mL) | water [M] | 29% ammonia water ($NH_3 \cdot H_2O$) [M] | organic-inorganic hybrid precursor based on the core material |
|---|---|---|---|---|---|
| Example 1 | 1 g | 100 | 10M | 0.2M | 10 w % |
| Example 2 | 1 g | 100 | 10M | 0.2M | 30 w % |
| Example 3 | 1 g | 100 | 10M | 0.2M | 50 w % |

Cell Fabrication

A positive active material containing lithium cobalt oxide ($LiCoO_2$) was mixed with a conductive material containing carbon black to provide a mixture. A polyvinylidenefluoride binder was dissolved in a N-methyl-2-pyrrolidone solvent to provide a binder solution, and was added to the prepared mixture to provide a positive active material slurry.

The prepared positive active material slurry was coated on aluminum foil to a thickness of 20 μm using a doctor blade technique, dried under a vacuum atmosphere at a temperature of 120° C. for 10 hours to volatilize the N-methyl-2-pyrrolidone, and compressed to provide a positive electrode.

Negative active materials prepared according to Examples 1 and 3 were separately added to separate N-methylpyrrolidone-polyvinylidenefluoride solutions and carbon black conductive materials were added to provide negative active material slurries.

Comparative Example 1

A negative electrode slurry was prepared as above except that a non-coated silicon active material was used.

The negative active material slurries were each coated on copper foil to a thickness of 12 μm using a doctor blade technique, dried under a vacuum atmosphere at 120° C. for 10 hours to volatilize the N-methyl-2-pyrrolidone, and then compressed to provide a negative electrode.

With the prepared positive and negative electrodes and a polyolefin-based (polyethylene and polypropylene) separator, a rechargeable lithium battery was fabricated according to a commonly known method.

FT-IR Measurement

Figure 4:
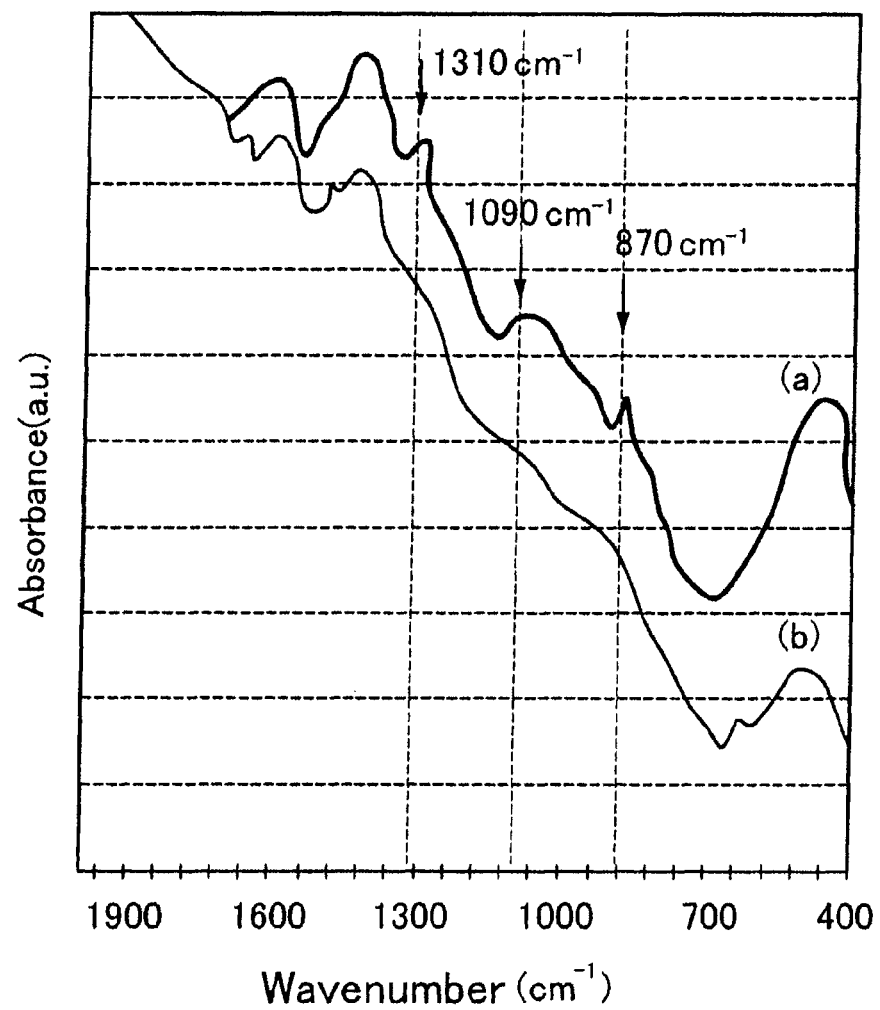
FIG. 4 is a graph of the FT-IR spectra of the negative active materials according to Example 1 and Comparative Example 1.

FT-IR spectra of the negative active materials according to Example 1 and Comparative Example 1 were taken and the results are shown in FIG. 4. In FIG. 4, (a) represents Comparative Example 1 and (b) represents Example 1. As shown in FIG. 4, the negative active material according to Comparative Example 1 (in which a coating layer was not formed) showed peaks corresponding to 870 $cm^{-1}$ (P—F($Li_xPF_y$: x=0 to 1, y is 5 to 6)), 1310 $cm^{-1}$, and 1090 $cm^{-1}$ ($ROCO_2Li$, R is $LiOOC(CH_2)_4COOLi$), which indicate the generation of an unstable material and deterioration in battery performance. On the other hand, the negative active material according to Example 1 (in which a coating layer was formed) did not show such peaks, indicating that the unstable material was not generated and the negative active material was stabilized.

Measuring Initial Coulombic Efficiency of Cell

Rechargeable lithium cells including negative active materials according to Examples 1 to 3 and Comparative Example 1 were charged until the voltage reached 4.2V, and discharged at 0.2 C until reaching 2.75 V. Then, the coulombic efficiency was measured to evaluate initial reversible efficiency. The results are shown in the following Table 2.

TABLE 2

|  | Coulombic Efficiency |
|---|---|
| Example 1 | 82.1% |
| Example 2 | 84.0% |
| Example 3 | 75.5% |
| Comparative Example 1 | 73.8% |

As shown in Table 2, it was confirmed that rechargeable lithium cells of Examples 1 to 2 had better initial coulombic efficiency compared to that of Comparative Example 1, and the rechargeable lithium cell of Example 3 had initial coulombic efficiency similar to that of Comparative Example 1.

Analysis of Cell Characteristics

Figure 5:
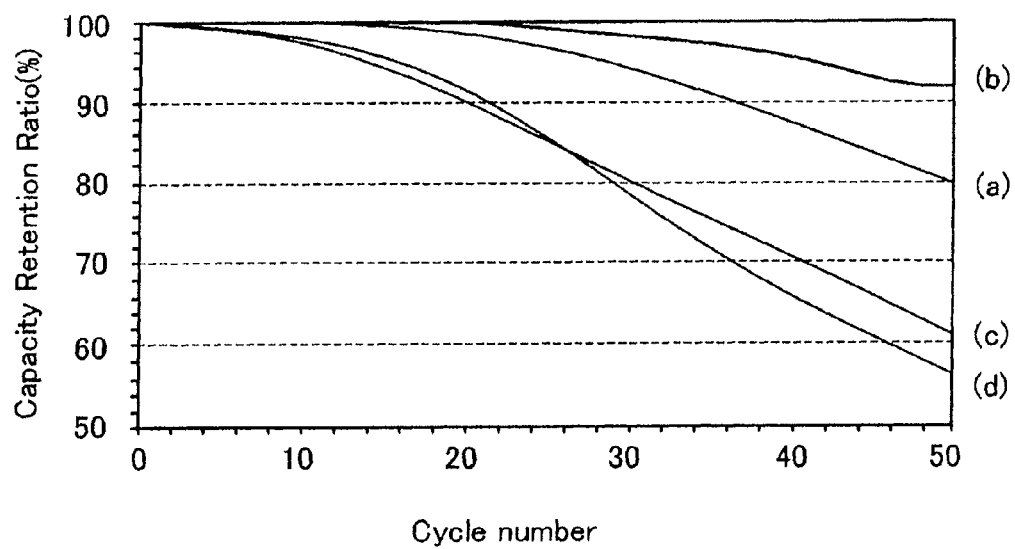
FIG. 5 is a graph of the cycle-life characteristics of the rechargeable lithium cells prepared according to Examples 1 through 3 and Comparative Example 1.

The cycle-life characteristics of the rechargeable lithium cells prepared according to Examples 1 to 3 and Comparative Example 1 were measured and the results are shown in FIG. 5. In FIG. 5, (a) represents Example 1, (b) represents Example 2, (c) represents Example 3, and (d) represents Comparative Example 1.

Rechargeable lithium cells according to Examples 1 to 3 and Comparative Example 1 were charged under a 0.2 C current until the voltage reached 4.2V and discharged under a 0.2 C current until the voltage reached 2.75V, and the charge and discharge cycles were repeated 50 times. Capacity retention rates at the 50th cycle are shown in FIG. 5. The capacity retention rate after completing 50 charge and discharge cycles refers to the ratio of the discharge capacity after the 50 charge and discharge cycles to the discharge capacity at the first charge and discharge cycle.

As shown in FIG. 5, the cell according to Comparative Example 1 (including the negative active material in which no reticular silicon oxide membrane covalently bonded to an organic chain was employed) showed a remarkably deteriorated capacity upon repetition of charge and discharge cycles. In contrast, the cells according to Examples 1 and 2 (including the negative active material in which a reticular silicon oxide membrane covalently bonded to an organic chain was employed) showed improved cycle-life characteristics compared to that of Comparative Example 1.

Further, the negative active material according to Example 3 had somewhat excessive amounts of the organic-inorganic precursor and the reticular membrane was formed somewhat thick. As a result, the cycle-life characteristics were inferior to those of Examples 1 to 2, but were still superior to those of Comparative Example 1 in which no coating layer was formed.

In the inventive negative active materials, the reticular silicon oxide layer is formed on a silicon negative active material surface. Due to the direct contact between the silicon active material and the electrolyte, the decomposition reaction of the electrolyte was decreased. Further, the organic chain covalently bonded to the reticular silicon oxide layer decomposed together with the electrolyte component upon initial lithium charge to provide a polymer membrane. In the membrane, the double bond in the organic-inorganic precursor represented by Chemical Formula 1 serves as a polymerization site to generate polymethylmethacrylate (PMMA) having good affinity to the electrolyte. Therefore, the membrane can maintain characteristics to reserve the electrolyte in the electrode and facilitate transmission of lithium ions to the silicon active material. Accordingly, Examples 1 to 3, and specifically Examples 1 and 2, can improve battery cycle-life characteristics.

The negative active materials for rechargeable lithium batteries according to the present invention minimize reactivity at the interface between the negative electrode and the electrolyte, thereby improving the reversible efficiency and cycle-life characteristics of the batteries.

While certain exemplary embodiments of this invention have been illustrated and described, it will be understood by those of ordinary skill in the art that various modifications and changes may be made to the described embodiments without departing from the spirit and scope of the invention as defined in the appended claims.

What is claimed is:

1. A method of fabricating a negative active material for a rechargeable lithium battery, the method comprising:
    mixing a core material, an organic solvent, a base, and water to provide a core solution, the core material being selected from the group consisting of Si oxides, Sn, Sn oxides, composite tin alloys, transition metal oxides, lithium metal nitrides, lithium metal oxides, lithium metal alloys, and combinations thereof;
    mixing an organic-inorganic hybrid precursor, an organic solvent, and water to provide a precursor solution; and
    mixing the core solution with the precursor solution to provide a negative active material comprising the core material and a coating layer having a reticular structure on the core material, the coating layer on the core material comprising a plurality of -M-O-M- units, wherein M is selected from the group consisting of Si, Ti and Al, and M is bonded to a side chain comprising an organic functional group represented by $R_1$—CH=$CR_2$—$(R_3)_m$—$(R_4)_n$—, wherein $R_1$ and $R_2$ are independently selected from the group consisting of H, $CH_3$ and $CH_2CH_3$, $R_3$ is $CO_2$, $R_4$ is selected from the group consisting of $CH_2$ and $CH_2CH_2O$, m is selected from the group consisting of 0 and 1, and n ranges from 1 to 5.

2. The method of claim 1, wherein the base is an ammonia solution.

3. The method of claim 1, wherein the organic-inorganic hybrid precursor is present in an amount ranging from about 1 to about 30 wt % based on the total weight of the core material.

4. The method of claim 3, wherein the organic-inorganic hybrid precursor is present in an amount ranging from about 1 to about 10 wt % based on the total weight of the core material.

5. The method of claim 1, wherein the core material is present in an amount ranging from about 1 to about 10 g per 1000 ml of the organic solvent.

6. The method of claim 1, wherein the concentration of the base after the mixing the core solution with the precursor solution ranges from about 0.05 to about 1M.

7. The method of claim 1, wherein the concentration of water after the mixing the core solution with the precursor solution ranges from about 10 to about 20M.

8. The method of claim 1, wherein the organic-inorganic hybrid precursor comprises a material in which a metal is bonded to at least two functional groups taking part in a sol-gel reaction and with at least one functional group not taking part in the sol-gel reaction, wherein the metal is selected from the group consisting of Si, Ti and Al.

9. The method of claim 8, wherein the organic-inorganic hybrid precursor comprises a material represented by the following Formula 1:

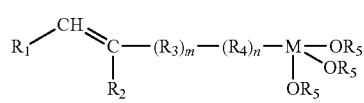

(1)

wherein $R_1$ and $R_2$ are each independently selected from the group consisting of H, $CH_3$, and $CH_2CH_3$, $R_3$ is $CO_2$, $R_4$ is selected from the group consisting of $CH_2$ and $CH_2CH_2O$, $R_5$ is selected from the group consisting of $C_1$ to $C_5$ linear alkyls, M is selected from the group consisting of Si, Ti and Al, m is selected from the group consisting of 0 and 1, and n ranges from 1 to 5.

10. The method of claim 1, wherein the organic-inorganic hybrid precursor is selected from the group consisting of alkoxides having a metal selected from the group consisting of Si, Ti and Al.

* * * * *